United States Patent Office 3,758,442
Patented Sept. 11, 1973

3,758,442
NOVEL POLYETHERESTERS OF HYDROXY-
ALKOXYL DIPHENYL-4-CARBOXYLIC ACID
PROCESS FOR PREPARATION THEREOF,
AND ARTICLES THEREOF
Takeo Shima, Seiichi Yamashiro, and Hiroo Inata,
Iwakuni, Japan, assignors to Teijin Limited, Osaka,
Japan
No Drawing. Filed Feb. 5, 1971, Ser. No. 113,084
Claims priority, application Japan, Feb. 9, 1970,
45/11,654; July 2, 1970, 45/57,873; July 31,
1970, 45/67,194
Int. Cl. C08g 17/02
U.S. Cl. 260—47 C
11 Claims

ABSTRACT OF THE DISCLOSURE

A novel linear polyetherester containing at least 70 mole percent recurring units expressed by the following formula

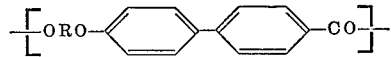

wherein R is an alkylene linkage having 2 to 10 carbon atoms, is produced by polycondensing a member selected from the group consisting of 4'-(ω-hydroxyalkoxy)diphenyl-4-carboxylic acid or its ester-forming derivatives of the formula

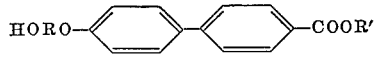

and mixtures of 4'-(ω-hydroxyalkoxy)diphenyl-4-carboxylic acid or its ester-forming derivatives with less than 30 mole percent of a copolymerizable third component such as a diol ester of an aromatic carboxylic acid, a diol ester of an aliphatic carboxylic acid, a diol ester of an alicyclic dicarboxylic acid, an aromatic hydroxycarboxylic acid, a polyethylene glycol, a trifunctional or tetrafunctional ester-forming compound, or a nuclear hydrogenated product of 4'-hydroxy-diphenyl-4-carboxylic acid.

This invention relates to novel polyetheresters useful as a material for the production of fibers, films and other melt-shaped articles, a process for production thereof, and to articles thereof. The novel polyesters have higher crystallinity and melting point than any known polyetheresters, and fabricated articles made therefrom have superior thermal resistance, resistance to chemicals, and resistance to hydrolysis, especially low shrinkage, superior dimensional stability, and high elasticity recovery and work recovery.

Heretofore, polyalkylene oxybenzoates have been known as polyetheresters for the production of fibers (see British Pat. No. 604,985). These polyetheresters have improved elasticity recovery and work recovery over the polyesters represented by polyethylene terephthalate, but not to any satisfactory extent. Their dimensional stability tends to be lower than that of polyethylene terephthalate. The fatal setback of these polyetheresters is their low melting point, which makes them inapplicable to the fields where thermal stability is required.

It has now been found that linear polyetheresters having at least 70 mol percent of the following repeating units

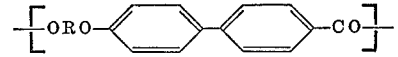

wherein R represents a C₂-C₁₀ alkylene linkage, in the molecular can be fabricated into melt-shaped articles, and have high crystallinity and melting point and can achieve superior improvements in dimensional stability elasticity recovery and work recovery.

Accordingly, an object of the present invention is to provide novel polyetheresters having superior properties mentioned above.

Another object of the invention is to provide a process for producing such novel polyetheresters.

A third object of the invention is to provide melt-shaped articles consisting of such novel polyetheresters having the improved properties.

Many other objects and advantages of the invention will become apparent from the following description.

The novel polyetheresters of the invention are linear polyetheresters containing in their molecule at least 70 mol percent, preferably at least 75 mol percent, more preferably at least 80 mol percent, of recurring units expressed by the following formula

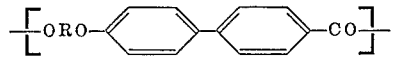

wherein R is a $C_2$-$C_{10}$ alkylene linkage, preferably $C_2$-$C_6$ alkylene linkage, more preferably $C_2$ or $C_6$ alkylene linkage, preferably linear polyetheresters having a reducing viscosity of 0.35 to 1.5, preferably 0.4 to 1.2, the reducing viscosity being measured at 35° C. using a solution of 0.12 g. of polymer dissolved by heating at 180° C. for 15 minutes in 10 cc. of a mixed solvent of phenol and 2,4,6-trichlorophenol at a weight ratio of 3:2.

The remainder is less than 30 mol percent, preferably not more than 25 mol percent, more preferably not more than 20 mol percent, of units derived from the group consisting of (1) diol esters of aromatic dicarboxylic acids, which may contain sulfonic groups, in which the aromatic ring contains 6, 10 or 12 carbon atoms;
(2) diol esters of aliphatic dicarboxylic acids in which the aliphatic group has not more than 10 carbon atoms;
(3) diol esters of alicyclic dicarboxylic acids in which the alicyclic group has not more than 6 carbon atoms;
(4) aromatic hydroxycarboxylic acids, which may contain sulfonic groups, in which the aromatic ring has 6, 10 or 12 carbon atoms, and ester-forming derivatives thereof;
(5) a nuclear hydrogenated product of 4'-hydroxydiphenyl-4-carboxylic acid or 4'(ω-hydroxyalkoxy)-diphenyl-4-carboxylic acid, and ester-forming derivatives thereof;
(6) polyethylene glycols having a molecular weight of 300 to 5,000;
(7) trifunctional or tetrafunctional ester-forming componds; and
(8) end-capping agents having one terminal ester-forming functional group at terminals.

Specific examples of these compounds will be illustrated later with respect to the preparation of the novel polyetheresters of the invention as copolymerizable third components.

The novel linear polyetheresters of the invention are obtained by polycondensing a member selected from the groups consisting of 4'-(ω-hydroxyalkoxy)diphenyl-4-carboxylic acid or its ester-forming functional derivatives represented by the following Formula 1

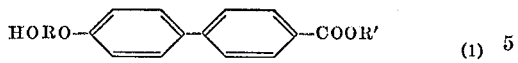

wherein R is a $C_2$–$C_{10}$, preferably $C_2$–$C_6$, more preferably $C_2$ or $C_6$ alkylene linkage, and R′ is a member selected from the group consisting of a hydrogen atom, a lower alkyl group, an aryl group and a $C_2$–$C_{10}$ aliphatic glycol residue,
and mixtures of 4′-(ω-hydroxyalkoxy)diphenyl-4-carboxylic acid and its ester-forming derivatives with less than 30 mol percent, preferably not more than 25 mol percent, more preferably not more than 20 mol percent, of a copolymerizable third component.

When R′ in the foregoing formula is a lower alkyl group, $C_1$–$C_4$ lower alkyl groups such as methyl, ethyl, propyl and butyl are preferred. In the case of the aryl group, a phenyl group and phenyl groups substituted by a lower alkyl group ($C_1$–$C_2$) are preferred. If desired, compounds containing a naphthyl group may also be used. When the R′ is an aliphatic glycol residue, $C_2$–$C_4$ aliphatic glycol residues are especially preferred. Of these, $C_1$–$C_4$ lower alkyl groups, phenyl groups that may be substituted by a lower lower alkyl group, and a hydrogen atom are especially preferred.

The 4′-(ω-hydroxyalkoxy)diphenyl-4-carboxylic acid or its ester-forming derivative can be readily produced by reacting 4′-hydroxydiphenyl-4-carboxylic acid or its ester-forming derivative such as lower alkyl ester or phenyl ester thereof having the following Formula 2

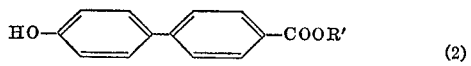

wherein R′ is the same as defined with respect to Formula 1 above, with a compound selected from the group consisting of alkylene halohydrins, ethylene oxide, and ethylene carbonate. The reaction is performed by contacting these reaction components. For example, a compound of the Formula 1 wherein R′ is hydrogen is obtained by adding an alkylene halohydrin dropwise to an aqueous alkali solution of the compound of the Formula 2 in which R′ is hydrogen and reacting them by heating under reflux. Compounds of the Formula 1 wherein R′ is other than hydrogen can be readily obtained by reacting the compound of Formula 1 in which R′ is hydrogen with the corresponding alcohols, aryl compounds and glycols for instance at 50 to 300° C.

As the alkylene halohydrins, alkylene chlorohydrins are preferred. The examples include $C_2$–$C_{10}$, preferably $C_2$–$C_6$, alkylene chlorohydrins, such as ethylene chlorohydrin, propylene chlorohydrin, trimethylene chlorohydrin, diethylene chlorohydrin, tetramethylene chlorohydrin, hexamethylene chlorohydrin, neopentylene chlorohydrin, heptamethylene chlorohydrin, octamethylene chlorohydrin, nonamethylene chlorohydrin, and decamethylene chlorohydrin. Alkylene bromohydrins may also be used similarly.

By polycondensing at least one of 4′-(ω-hydroxyalkoxy)diphenyl-4-carboxylic acid or its ester-forming derivative, linear polyetheresters containing 100 mol percent of recurring units in the molecule are formed.

According to the process of the invention, copoly-condensates of compounds of Formula 1 with less than 30 mol percent, preferably not more than 25 mol percent, and more preferably not more than 20 mol percent thereof of a copolymerizable third component can be formed.

Such third component includes the compounds (1) to (8) mentioned earlier in the specification.

Specific examples of the third component (1) include diol esters of isophthalic acid, terephthalic acid, naphthalene-2,6-dicarboxylic acid, naphthalene - 1,5-dicarboxylic acid, diphenyl-4,4′-dicarboxylic acid,

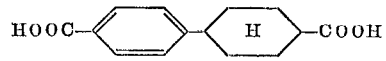

[p-(4 - carboxycyclohexyl)benzoic acid] 4,4′ - diphenylsulfone dicarboxylic acid, sodium 3,5 - dicarboxybenzene - 1 -sulfonate, disodium 3,7 - dicarboxynaphthalene-1,5-disulfonate, or other aromatic dicarboxylic acids which may contain sulfonic acid groups (including its alkali metal salts) in which the aromatic ring has 6, 10 or 12 carbon atoms.

These compounds may be added to the reaction system in the form of diol ester, or it is also possible to add the aromatic dicarboxylic acid or its derivative and diols separately to the reaction system, and form the diol ester within the system. Thus, the term "diol ester" includes the latter case.

Specific examples of the diols that can be used in the invention include ethylene glycol, propylene glycol, trimethylene glycol; diethylene glycol, tetramethylene glycol, hexamethylene glycol, neopentylene glycol, p-xylylene glycol, 1,4-cyclohexanedimethanol, bisphenol A, bis-(p-hydroxyphenyl)sulfone, 1,4-bis(β-hydroxyethoxy)benzene, 2,2-bis[p - (β - hydroxyethoxy)phenyl]propane, or polyalkylene glycol. Polymers to be derived from the diol esters of these aromatic dicarboxylic acids can also be used.

As the third component (2) mentioned above, we can mention, for instance, the diol esters of oxalic acid, succinic acid, adipic acid, sebacic acid, undecanedicarboxylic acid, or dodecanedicarboxylic acid. The same diols as illustrated above with respect to the component (1) can be employed. The diol esters (2) can also be formed in the reaction system similarly to the case of the component (1) above.

Examples of the third component (3) which is a diol ester of an alicyclic dicarboxylic acid having not more than 6 carbon atoms include the diol esters of cyclopropanedicarboxylic acid, cyclobutanedicarboxylic acid, or hexahydroterephthalic acid. The same diols as illustrated above with respect to the component (1) can be employed. The diol esters (2) can also be formed in the reaction system similarly to the case of the component (1) above.

The examples of the third component (4) mentioned above, which is an aromatic hydroxycarboxylic acid which may contain sulfonic acid groups (including its alkali metal salts) in which the aromatic ring has 6, 10 or 12 carbon atoms or an ester-forming derivative thereof, include p-hydroxybenzoic acid, p-(β-hydroxyethoxy)benzoic acid, 6-(β-hydroxyethoxy)-naphthalene-2-carboxylic acid, sodium 4′ - carboxy-4-(β-hydroxyethoxy)diphenyl-3-sulfonate, and their ester-forming derivatives such as lower alkyl ($C_1$–$C_2$) esters of said hydroxycarboxylic acids or phenyl [which may contain a lower ($C_1$–$C_2$) alkyl ester] esters of said hydroxycarboxylic acids.

As the third component (5) mentioned above, there can be mentioned, for instance, the nuclear hydrogenated product of 4′-hydroxydiphenyl-4-carboxylic acid or 4′-(ω-hydroxyalkoxy) - diphenyl-4-carboxylic acid, lower alkyl (e.g., $C_1$–$C_4$) esters thereof, and phenyl (which may contain a $C_1$–$C_2$ lower alkyl ester) esters thereof.

It is to be understood that when the amount of the unit derived from a polyethylene glycol [component (6)] having a molecular weight of 300 to 5,000, preferably 500 to 3,000 is calculated on the basis that the $-(OCH_2CH_2)-$ unit is one mol.

The examples of the third component (7) include glycerine, pentaerythritol, and tremethylol propane. The amount of this component should be as small as possible, for instance about 0.5 mol percent at most, so that the final linear polyetherester will not substantially lose its linearity.

The end-capping agent (8) is a compound having one ester-forming functional group as is known in the case of polyester, and includes, for example, benzoic acid, benzoylbenzoic acid, benzyloxybenzoic acid, phenolsulfonic acid, naphtholsulfonic acid, and methoxypolyalkylene glycols. The amount of this component should be one sufficient for end capping, and is usually less than amount 3 mol percent.

The compounds (1) to (8) as the third component may be used singly or in combination. The total amount of these compounds is less than 30 mol percent, preferably not more than 25 mol percent, more preferably not more than 20 mol percent. Usually, the amounts of compounds (7) and (8) are as small as mentioned above.

The amounts may be properly varied according to the type of the third component and the object of modification. But excessive amounts cannot lead to the achievement of the improved properties of the linear polyetheresters of the invention. Accordingly, the above-specified range should be observed.

The linear polyetheresters of the invention are obtained by polycondensing a compound selected from the group consisting of 4'-(β-hydroxyalkoxy)diphenyl-4-carboxylic acid, its ester-forming derivatives, and mixtures of 4'-(β-hydroxyalkoxy)diphenyl - 4-carboxylic acid or its ester-forming derivatives with less than 30 mol percent of a copolymerizable third component. The polycondensation reaction can be effected in the same way as in the polycondensation of polyester represented by polyethylene terephthalate. Most commonly, the polycondensation is performed in the presence of a catalyst in the molten or solid state, for instance, by directly polycondensing 4'-(β-hydroxyalkoxy)diphenyl-4-carboxylic acid at a temperature above its melting point; or by the alcohol-removing reaction, phenol-removing reaction or glycol-removing reaction of an ester-forming derivative of the 4'-(β-hydroxyalkoxy)diphenyl-4-carboxylic acid according to the group R'.

Ordinary catalysts, stabilizers, pigments and other additives used in the production of polyesters can be used in the polycondensation reaction in the present invention. As the catalyst, elements or compounds of sodium, potassium, lithium, calcium, magnesium, barium, tin, strontium, zinc, iron, aluminum, cobalt, lead, nickel, titanium, manganese, cadmium, antimony, and boron, the compounds including oxides, hydrides, hydroxides, halides, inorganic acid salts, organic acid salts, complex salts, double salts, alcoholates, and phenolates can be used. These may be used either alone or in admixture. For instance, combinations of antimony trioxide with a titanium tetra-lower alkoxide such as titanium tetrabutoxide, or titanium tetraisopropoxide, a titanium compound such as titanium potassium oxalate, or an alkali metal salt or alkaline earth metal salt of a lower fatty acid such as lithium acetate can be used or calcium acetate. The catalyst is added to the reaction system in an amount of about 0.005 to 0.1 mol percent based on the reactants although the amount may vary according to the types of the catalyst.

Stabilizers such as phosphoric acid, phosphorous acid, phosphonic acid, esters, such as alkyl esters and aryl esters, of these, and phosphines may be used in an amount similar to that specified with respect to the catalyst.

When it is desired to obtain a polymer of 4'-(ω-hydroxyalkoxy)diphenyl - 4-carboxylic acid of particularly high molecular weight, it is preferable to employ the solid-phase polymerization method in which the polymer produced by the melt polymerization method is pulverized, and heated to the temperature below its melting point under reduced pressure and/or in a stream of an inert gas such as $N_2$ and $CO_2$.

According to the present invention, a melt-shaped article of a linear polyetheresters can be obtained having at least 70 mol percent, preferably at least 75 mol percent, more preferably at least 80 mol percent, of units expressed by the following formula

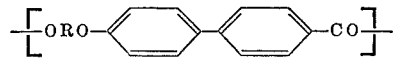

wherein R is an alkylene linkage having 2 to 10 carbon atoms, preferably 2 to 6 carbon atoms, more preferably 2 or 6 carbon atoms.

preferably one having a reducing viscosity of 0.35 to 1.5, preferably 0.4 to 1.2, the reducing viscosity being measured at 35° C. using a solution of 0.12 g. of polymer dissolved by heating at 180° C. for 15 minutes in 10 cc. of a mixed solvent of phenol and 2,4,6-trichlorophenol at a weight ratio of 3:2.

If desired, the linear polyetherester of the invention may be used in a blend with other polymers, preferably polyesters, other polyetheresters, polyamides or modified polymers thereof.

The melt-shaped articles may be in the form of fibers, tapes, films, sheets, or plastics, etc. The production of the melt-shaped articles may be performed by using known fiber-, film- or plastics-forming techniques under the melt-shaping conditions.

One preferred example of producing fibers will be given below.

(A) MELT-SPINNING

The polymer is melted at a temperature above its melting point, for example, about 240 to 340° C., extruded from a spinneret, and cooled and solidified under tension. By heating the ambient atmosphere of the filament in a region 100 cm. below the spinneret to about from 200 to 310° C., undrawn filaments having a small degree of molecular orientation which can be drawn at high ratio in the subsequent drawing step can be obtained.

(B) DRAWING AND HEAT-TREATMENT

The undrawn filaments so obtained can be drawn in a first step at a temperature of 70 to 200° C. or at a low temperature if desired to at least 2.0 times, preferably at least 2.5 times, and in a second step heat-treated at a temperature below the melting point of the filament, preferably 100 to 260° C. The drawing and heat-treating temperatures mentioned above are the temperatures of the surface of the filaments which is in many cases lower than the prescribed temperature of the heating means. Any heating means can be used for the drawing and heat-treating, and any conventional drawing and heat-treating apparatus can be used for this purpose.

When the filaments are wound up at a speed as high as 3,000 meters/min. or more at the time of spinning, the drawing step can be omitted.

The melt-shaped articles of the present invention have excellent elasticity recovery, work recovery, dimensional stability, thermal stability, resistance to chemicals, and resistance to hydrolysis. For example, the fibers obtained by the above procedure, have good silk-like feel, an elasticity recovery at 10% stretch of at least 70%, and a work recovery at 10% stretch of at least 45%. Also, they have a shrinkage of not more than 6% when relaxed for 15 minutes in dry heat at 180° C. In addition, these fibers have very small shrinkage in boiling water, and superior resistances to heat, chemicals and hydrolysis.

Woven and knitted fabrics composed of these fibers are superior in feel, crease resistance, wash and wear properties, and dimensional stability, and find utility not only in apparel and interior decorating uses, but also as fishing nets, tire cords, and belt cords. These fibers in their tape, film, or sheet forms also find application in packaging and electrical appliances.

The invention will be described further by the following examples in which the shrinkage, elasticity recovery, work recovery and melting point of the filaments were measured by the following procedures.

(A) SHRINKAGE

A filament is wound through 20 turns around a sizing reel having a circumferential length of about 110 cm., and the length ($l_0$) of the filament under an initial load of 1/30 (g.) of the total denier of the filament is measured.

In the case of determining the shrinkage in boiling water, the filament is immersed for 30 minutes in boiling water and air dried, after which the length ($l_1$) of the filament under the same initial load is measured. In the case of determining the shrinkage in dry heat, the filament is put in an air dryer for 15 minutes at 180° C., and the length ($l_1$) of the filament under the same initial load is measured. The shrinkage is computed from the following equation.

$$\text{Shrinkage} = \frac{l_0 - l_1}{l_0} \times 100\%$$

(B) ELASTICITY RECOVERY

A 20 cm. long filament is stretched at a rate of 4 cm. per minute until the filament length increases 5%. Then, the stretch is released until the stress reaches zero. It is again stretched until its length increases 10%, and then returned to the original state. The procedure is repeated, and the stress and strain are measured. The ratio of recovery to the stretch is computed from the stress-strain curve.

(C) WORK RECOVERY

Filaments having a length of 20 cm. are stretched 3%, 5%, and 10% respectively, maintained for 30 seconds, and returned to the original state. The work recovery is determined from the load-stretch curve. Unless otherwise specified, all values are measured in air at room temperature. Where "wet" is referred to, the values are measured in water at 60° C. by the same procedure.

(D) MELTING POINT

The melting point is measured using a differential scanning calorimeter (Perkin-Elmer DSC 1, product of Perkin-Elmer Company, U.S.A.) at a temperature raise rate of 10° C./min.

Example 1

Production of polymer.—A three-necked flask equipped with a stirrer, a nitrogen inlet, and a distillation outlet was charged with 250 g. of methyl 4'-(β-hydroxyethoxy) diphenyl - 4 - carboxylate and 0.033 g. (0.01 mol percent) of titanium potassium oxalate. After thorough purging with a nitrogen gas, the materials were heated with stirring to 280° C. while slowly flowing nitrogen gas. After a lapse of about 30 minutes, the reaction temperature was raised to 315° C. The heating with stirring was continued for 2 hours in a vacuum of 0.5 mm. Hg. The polymer obtained was a white crystalline polymer having a reducing viscosity of 0.66 and a melting point of 306° C. This polymer was further polymerized in the solid state at 270° C. and 0.5 mm. Hg for 4 hours to form a polymer having a reducing viscosity of 0.72.

Production of filament.—After thorough drying, the polymer obtained was spun at 320° C. using a spinneret having 12 holes with a diameter of 0.3 mm. and a length of 0.9 mm. at an extrusion rate of 8.0 g./min., and wound up at a rate of 300 meter/min. At this time, the temperature of the filament was adjusted to 300° C. by providing a heated spinning cell at a position 30 cm. below the spinneret. The filament obtained had a reducing viscosity of 0.69.

The filament was fed through rollers having a peripheral speed of 20 meters/min., and passed in contact with a plate having a surface temperature of 170° C. provided between the rollers to draw it to 3.42 times the original length. The drawn filament was then passed under constant length in contact with a plate having a surface temperature of 230° C. provided between the next pair of rollers.

The drawn filaments obtained above exhibited very superior elasticity recovery, work recovery and shrinkage as shown in Table 1 below. For the sake of comparison, the properties of commercially available PACM-12 polyamide (PACM-12 for short), polyethylene oxybenzoate (PEOB for short), and polyethylene terephthalate (PET for short) filaments are also given in Table 1.

TABLE 1

| | Filament of invention | PEOB | PACM-12 | PET |
|---|---|---|---|---|
| Elasticity recovery— | | | | |
| At 5% stretch | 99.0 | 94.0 | 95.7 | 88.5 |
| At 10% stretch | 96.0 | 57.9 | 75.9 | 57.3 |
| Work recover— | | | | |
| At 5% stretch | 81 | 54 | 76 | 40 |
| At 10% stretch | 65 | 44 | 43 | 18 |
| At 5% stretch (wet) | 76 | 50 | 70 | 38 |
| Shrinkage— | | | | |
| In boiling water | 1.1 | 8.9 | 4.4 | 8.1 |
| In dry heat | 2.3 | 17.6 | 6.0 | 15.8 |

EXAMPLE 2

A filament having a reducing viscosity of 0.59 obtained by the same procedure as set forth in Example 1 was drawn to 3.50 times the original length by the same procedure as set forth in Example 1. The drawn filament was heat treated under a constant length at 230° C. The filament obtained had an elasticity recovery (at 10% stretch) of 97%, a work recovery (at 10% stretch) of 63%, and a dry heat shsrinkage (at 180° C.) of 2.1%. Using this drawn filament, resistances to hydrolysis and heat were tested. The resistance to hydrolysis is expressed by the ratio of retention of the reducing viscosity when the filament is treated for 8 hours in steam at 150° C. The resistance to heat is the ratio of retention of strength when the filament is treaed for 400 hours in air a 220° C. The results are given in Table 2 below.

TABLE 2

| | Resistance to hydrolysis, percent | Resistance to heat, percent |
|---|---|---|
| Filament of the invention (Example 2) | 97.6 | 92.5 |
| Polyethylene terephthalate | 74.0 | 55.0 |
| PEOB filament | 91.8 | (¹) |

¹ Not measurable because of melting.

Example 3

Production of polymer.—A reactor of the same type as used in Example 1 was charged with 245 g. of methyl 4'-(β-hydroxyethoxy)diphenyl-4-carboxylate, 27 g. of dimethyl 4,4'-diphenyldicarboxylate, and 13.5 g. of ethylene glycol (at a molar ratio of 9.0/1.0/2.2), and 0.176 g. (0.1 mol percent) of calcium acetate. The temperature inside the reactor was raised to 200 to 220° C. After stopping of the distilling out of methanol, 0.082 g. (0.1 mol percent) of phosphorous acid and 0.087 g. (0.03 mol percent) of antimony trioxide were added, and the temperature inside the reactor was raised to 280° C. The melt polymerization was performed at this temperature at atmospheric pressure for 30 minutes, and then for 3 hours at a reduced pressure of 0.5 mm. Hg. The polymer obtained was a white crystalline polymer having a reducing viscosity of 0.83 and a melting point of 285° C.

Production of filament.—The polymer was spun and drawn in the same way as set forth in Example 1. The spinning and drawing conditions were prescribed as follows:

Spinning temperature _____ °C__ 300
Temperature of the spinning cell _____ °C__ 290
Drawing temperature:
    First step _____ °C__ 160
    Second step _____ °C__ 220
Draw ratio:
    First step _____ 3.83
    Second step _____ 1.00

The resulting undrawn filament has a reducing viscosity of 0.78. The drawn filament had an elasticity recovery at 10% stretch of 85%, a work recovery at 10% stretch of 59%, and a dry heat shrinkage at 180° C. of 3.7%.

Example 4

Production of polymer.—A three-necked flask equipped with a stirrer, a nitrogen gas inlet and a distillation outlet was charged with 180 g. of methyl 4'-($\omega$-hydroxyhexamethyleneoxy)diphenyl-4-carboxylate, 0.0585 g. (0.03 mol percent) of titanium potassium oxalate, and 0.022 g. (0.05 mol percent) of phosphorus acid. After thorough purging with nitrogen, the materials were heated to 250° C. with stirring while flowing nitrogen gas slowly. After a lapse of about 30 minutes, the reaction temperature was raised to 270° C. Heating with stirring was continued for 3 hours in a vacuum of 0.5 mm. Hg. The resulting polymer is a white crystalline polymer having a reducing viscosity of 0.91 and a melting point of 236° C.

Production of filaments.—After thorough drying, the polymer obtained was spun at 270° C. using a spinneret having 12 holes with a diameter of 0.3 mm. and a length of 0.9 mm. at an extrusion rate of 8.0 g./min., and wound up at a rate of 300 meters/min. At this time, a heated spinning cell was provided at a position 30 cm. below the spinneret so that the extruded filament had a temperature of 230° C. Below this cell a cooling cell was provided so that the extruded filament was rapidly coold to 150° C. or lower. The resulting filament had a reducing viscosity of 0.87.

The filament was passed through a pair of rollers having a peripheral speed of 20 meters per minute and contacted with a plate provided between the rollers and having a surface temperature of 105° C. to thereby draw it to 2.70 times the original length. The drawn filament was then passed through another pair of rolls and contacted with a plate having a surface temperature of 160° C. provided therebetween, and then wound up.

The resulting drawn filament had an elasticity recovery at 10% stretch of 88%, a work recovery at 10% stretch of 60%, and a shrinkage in boiling water of 1.9%, showing superior properties.

Example 5

A reactor of the same type as used in Example 1 was charged with 10 g. of 4'-($\beta$-hydroxyethoxy)diphenyl-4-carboxylic acid, 2.9 g. of ethylene glycol, and 0.0026 g. (0.1 mol percent) of lithium acetate, and the temperature inside the reactor was raised to 240° C. After stopping of the distilling out of water, 0.0032 g. (0.1 mol percent) of phosphorous acid and 0.0057 g. (0.05 mol percent) of antimony trioxide were added. The polymerization was performed in the same way as set forth in Example 1. The resulting polymer had a reducing viscosity of 0.54 and a melting point of 301° C., and was white.

Example 6

A reactor of the same type as used in Example 1 was charged with 3 g. of methyl 4'-hydroxydiphenyl-4-carboxylate, 1.5 g. of ethylene carbonate and 0.0009 g. (0.02 mol percent) of titanium tetrabutoxide, and the materials were heated to 230° C. After stopping of carbon dioxide gas evolution, the polymerization was performed in the same way as set forth in Example 1. The resulting polymer was a slightly yellowish white crystalline polymer having a reducing viscosity of 0.53 and a melting point of 291° C.

Example 7

A three-necked flask equipped with a stirrer, a nitrogen gas inlet and a distillation outlet was charged with 16.6 g. of methyl 4'-($\gamma$-hydroxytrimethyleneoxy)diphenyl-4-carboxylate and 0.004 g. (0.02 mol percent) of titanium potassium oxalate. After thorough purging with nitrogen, the materials were heated to 250° C. with stirring while slowly flowing nitrogen gas. After a lapse of about 30 minutes, the reaction temperature was raised to 320° C., and the heating with stirring was continued for one hour under a vacuum of 0.5 mm. Hg. The resulting polymer was a slightly yellowish white crystalline polymer having a reducing viscosity of 0.52 and a melting point of 313° C.

Example 8

A reactor of the same type as used in Example 6 was charged with 15 g. of 4-($\omega$-hydroxyhexamethylene-oxy)diphenyl-4-carboxylic acid, 3.6 g. of ethylene glycol, and 0.005 g. (0.15 mol percent) of lithium acetate, and the temperature inside the reactor was raised to 240° C. After stopping of the distilling out of water, 0.006 g. of phosphorous acid and 0.007 g. (0.05 mol percent) of antimony trioxide were added. The materials were melted with stirring at 250° C. After a lapse of 30 minutes, the reaction temperature was raised to 270° C., and the reaction was continued for 2 hours in a vacuum of 0.5 mm. Hg at this temperature. The resulting polymer was a white crystalline polymer having a reducing viscosity of 0.66 and a melting point of 236° C.

Example 9

A reactor of the same type as used in Example 1 was charged with 21.8 g. of methyl 4'-($\beta$-hydroxyethoxy)diphenyl-4-carboxylate, 3.9 g. of dimethylterephthalate, 2.7 g. of ethylene glycol (molar ratio of 8.0/2.0/4.4), and 0.0176 g. (0.1 mol percent) of calcium acetate, and the temperature inside was raised to 200–220° C. After stopping of the distilling out of methanol, 0.0082 g. (0.1 mol percent) of phosphorous acid and 0.0087 g. (0.03 mol percent) of antimony trioxide were added. The inside temperature was raised to 280° C., and the melt-polymerization was performed for 30 minutes at atmospheric pressure, and then for 3 hours at a reduced pressure of 0.05 mm. Hg. The resulting polymer was a white crystalline polymer having a reducing viscosity of 0.78 and a melting point of 273° C.

Example 10

A reactor of the same type as used in Example 1 was charged with 24.5 g. of methyl 4'($\beta$-hydroxyethoxy)diphenyl-4-carboxylate, 2.1 g. of ethyl p-($\beta$-hydroxyethoxybenzoate) (mole ratio of 9/1), and 0.0068 g. (0.02 mol percent) of titanium tetrabutoxide. After thorough purging with nitrogen, the materials were heated to 280° C. and melted with stirring. After a lapse of about 30 minutes, the reaction temperature was raised to 300° C., and the polymerization was conducted for 2 hours at 0.5 mm. Hg at this temperature. The resulting polymer was a white crystalline polymer having a reducing viscosity of 0.63 and a melting point of 288° C.

Examples 11 to 22

The same procedures as set forth in Examples 8 or 9 was repeated except that the types and amounts of the third components, the types and amounts of 4'-($\omega$-hydroxyalkoxy) diphenyl-4-carboxylic acid or its ester-forming derivatives, and the reaction time and temperature in high vacuum after the 30 minutes reaction were varied as shown in Table 3. The results obtained are also given in Table 3.

TABLE 3

| Example No. | 4'-(β-hydroxyethoxy) diphenyl-4-carboxylic acid or its ester-forming derivatives | | Third components | | Reaction under high vacuum | | Polyetherester formed | |
|---|---|---|---|---|---|---|---|---|
| | Nomenclature | Amount (mol percent) | Nomenclature | Amount (mol percent) | Temperature (°C.) | Time (min.) | Reducing viscosity | Melting point (°C.) |
| 11 | Phenyl 4'-(β-hydroxyethoxy) diphenyl-4-carboxylate. | 90 | Diphenyl sebacate ethylene glycol. | 10 | 300 | 45 | 0.56 | 279 |
| 12 | do | 90 | Dimethyl dodecanoate ethylene glycol. | 10 | 300 | 45 | 0.58 | 289 |
| 13 | Methyl 4'-(β-hydroxyethoxy) diphenyl-4-carboxylate. | 90 | Dimethyl hexahydroterephthalate and ethylene glycol. | 10 | 300 | 30 | 0.95 | 278 |
| 14 | do | 90 | Dimethyl isophthalate ethylene glycol. | 10 | 300 | 30 | 0.77 | 282 |
| 15 | do | 90 | Methyl 6(β-hydroxyethoxy)-2-naphthoate. | 10 | 300 | 30 | 0.65 | 284 |
| 16 | n-Propyl 4'-(β-hydroxyethoxy) diphenyl-4-carboxylate. | 84.4 | Polyethylene glycol (molecular weight 2,000). | 15.6 | 310 | 30 | 0.52 | 302 |
| 17 | do | 90 | Methyl dodecahydro-4'-(β-hydroxyethoxy)-4-carboxylate. | 10 | 300 | 45 | 0.50 | 290 |
| 18 | do | 82.4 | Sodium 3,5-dicarbomethoxy-benzene-1-sulfonate, ethylene glycol and polyethylene glycol having a molecular weight of 600. | 2, 15.6 | 300 | 70 | 0.63 | 291 |
| 19 | do | 98 | Sodium phenol-3-sulfonate | 2 | 300 | 30 | 0.41 | 296 |
| 20 | do | 98 | Sodium 3,5-dicarbomethoxy-benzene-1-sulfonate and ethylene glycol. | 2 | 310 | 30 | 0.41 | 299 |
| 21 | Methyl 4'-(β-hydroxyethoxy) diphenyl-4-carboxylate. | 98 | Sodium 4-'carbomethoxy-4-(β-hydroxyethoxy) diphenyl-3-sulfonate. | 2 | 320 | 30 | 0.54 | 302 |

What we claim is:

1. A linear film- and fiber-forming polyetherester containing at least 70 mol percent of recurring units expressed by the following formula

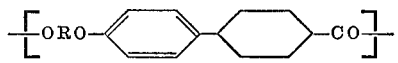

wherein R is an alkylene linkage having 2 to 10 carbon atoms,
said polyetherester being obtained by polycondensing a member selected from the group consisting of 4'-(ω-hydroxyalkoxy)diphenyl-4-carboxylic acid or an ester-forming derivative expressed by the Formula 1

wherein R is as defined above, and R' is a member selected from the group consisting of a hydrogen atom, a lower alkyl group, an aryl group and an aliphatic glycol residue having 2 to 10 carbon atoms,
in an amount of at least 70 mol percent based on the total monomers with up to 30 mol percent of a compound selected from the group consisting of:

(1) a diol ester of an aromatic dicarboxylic acid or a diol ester of an aromatic dicarboxylic acid which contains sulfonic acid groups, the aromatic ring of each of said dicarboxylic acids containing 6, 10 or 12 carbon atoms,
(2) a diol ester of an aliphatic dicarboxylic acid in which the aliphatic group has up to 10 carbon atoms,
(3) a diol ester of an alicyclic dicarboxylic acid in which the alicyclic group has not more than 6 carbon atoms,
(4) an aromatic hydroxycarboxylic acid in which the aromatic ring has 6, 10 or 12 carbon atoms, an aromatic hydroxycarboxylic acid which contains sulfonic acid groups in which the aromatic ring has 6, 10 or 12 carbon atoms, a lower alkyl ester of each of said hydroxycarboxylic acids, a phenyl ester of each of said hydroxycarboxylic acids or a lower alkyl phenyl ester of each of said hydroxycarboxylic acids,
(5) a nuclear hydrogenated product of 4'-hydroxydiphenyl-2-carboxylic acid or 4'-(ω-hydroxyalkoxy) diphenyl-4-carboxylic acid, a lower alkyl ester of said nuclear hydrogenated product, a phenyl ester of said nuclear hydrogenated product or a lower alkyl phenyl ester of said nuclear hydrogenated product,
(6) polyethylene glycols having a molecular weight of 300 to 5,000, and
(7) a component selected from glycerine, pentaerythritol, trimethylol propane, benzoic acid, benzoylbenzoic acid, benzyloxybenzoic acid, phenolsulfonic acid, naphtholsulfonic acid and methoxypolyalkylene glycol.

2. A linear homo-polyetherester having the following recurring units

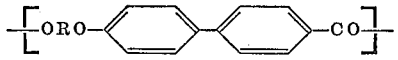

wherein R is an alkylene linkage having 2 to 6 carbon atoms.

3. The linear film and fiber-forming polyetherester of claim 1 having a reduced viscosity, as measured at 35° C. in a solution in a mixed solvent consisting of phenol and 2,4,6-trichlorophenol at a weight ratio of 3:2, of 0.35 to 1.5.

4. A melt-shaped article composed of a linear polyetherester containing at least 70 mol percent of recurring units expressed by the following formula

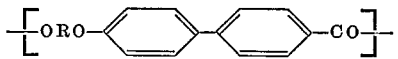

wherein R is an alkylene linkage having 2 to 10 carbon atoms,
in the molecule, said linear polyetherester being obtained by polycondensing a member selected from the group consisting of 4'-(ω-hydroxyalkoxy)diphenyl-4-carboxylic acid or an ester-forming derivative expressed by the Formula 1

wherein R is as defined above, and R' is a member selected from the group consisting of a hydrogen atom, a lower alkyl group, an aryl group and an aliphatic glycol residue having 2 to 10 carbon atoms,
in an amount of at least 70 mol percent based on the total monomers with up to 30 mol percent of a compound selected from the group consisting of:

(1) a diol ester of an aromatic dicarboxylic acid or a diol ester of an aromatic dicarboxylic acid which contains sulfonic acid groups, the aromatic ring of each of said dicarboxylic acids containing 6, 10 or 12 carbon atoms,
(2) a diol ester of an aliphatic dicarboxylic acid in which the aliphatic group has up to 10 carbon atoms,
(3) a diol ester of an alicyclic dicarboxylic acid in which the alicyclic group has not more than 6 carbon atoms, (4) an aromatic hydroxycarboxylic acid in which the aromatic ring has 6, 10 or 12 carbon atoms, an aromatic hydroxycarboxylic acid which contains sulfonic acid groups in which the aromatic ring has 6, 10 or 12 cabron atoms, a lower alkyl ester of each of said hydroxycarboxylic acids, a phenyl ester of each of said hydroxycarboxylic acids or a lower alkyl phenyl ester of each of said hydroxycarboxylic acids, (5) a nuclear hydrogenated product of 4'-hydroxydiphenyl-2-carboxylic acid or 4'-(ω-hydroxyalkoxy)diphenyl-4-carboxylic acid, a lower alkyl ester of said nuclear hydrogenated product, a phenyl ester of said nuclear hydrogenated product or a lower alkyl phenyl ester of said nuclear hydrogenated product, (6) polyethylene glycols having a molecular weight of 300 to 5,000, and (7) a component selected from glycerine, pentaerythritol, trimethylol propane, benzoic acid, benzoylbenzoic acid, benzyloxybenzoic acid, phenolsulfonic acid, naphtholsulfonic acid and methoxypolyalkylene glycol.

5. The melt-shaped article of claim 4 wherein R in the formula is an alkylene linkage having 2 to 6 carbon atoms, and the recurring units expressed by said formula account for at least 75 mol percent in the molecule.

6. The melt-shaped article of claim 4 wherein the article is a filament.

7. A process for producing a linear homo-polyetherester having the following recurring units

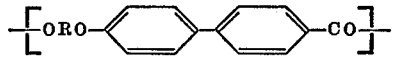

wherein R is an alkylene linkage having 2 to 6 carbon atoms,
which comprises melt-polycondensing a member selected from the group consisting of 4'-(ω-hydroxyalkoxy)diphenyl-4-carboxylic acid or an ester-forming derivative expressed by the Formula 1

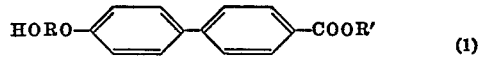

wherein R is as defined above, and R' is a member selected from the group consisting of a hydrogen atom, a lower alkyl group, an aryl group and an aliphatic glycol residue having 2 to 10 carbon atoms,
at a temperature from 270° C. to 320° C.

8. The linear film and fiber-forming polyetherester of claim 1 wherein recurring units expressed by the following formula

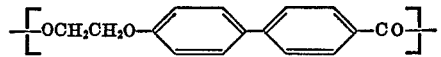

account for at least 75 mol percent in the molecule.

9. The melt-shaped article of claim 4 wherein the article is a tape.

10. The melt-shaped article of claim 4 wherein the article is a film.

11. The melt-shaped article of claim 4 wherein the article is a sheet.

References Cited
UNITED STATES PATENTS

| | | | |
|---|---|---|---|
| 2,350,326 | 6/1944 | DuVall et al. | 260—78 |
| 3,056,761 | 10/1962 | Griehl et al. | 260—47 |
| 3,345,331 | 10/1967 | Reese, Jr. | 260—47 |
| 3,515,696 | 6/1970 | Tsuji et al. | 260—47 |
| 3,398,121 | 8/1968 | Oxenrider et al. | 260—47 |

WILLIAM H. SHORT, Primary Examiner

L. L. LEE, Assistant Examiner

U.S. Cl. X.R.

117—161; 260—334 P, 45.7 P, 49, 469, 473 G, 520, 857 R, 860